UNITED STATES PATENT OFFICE.

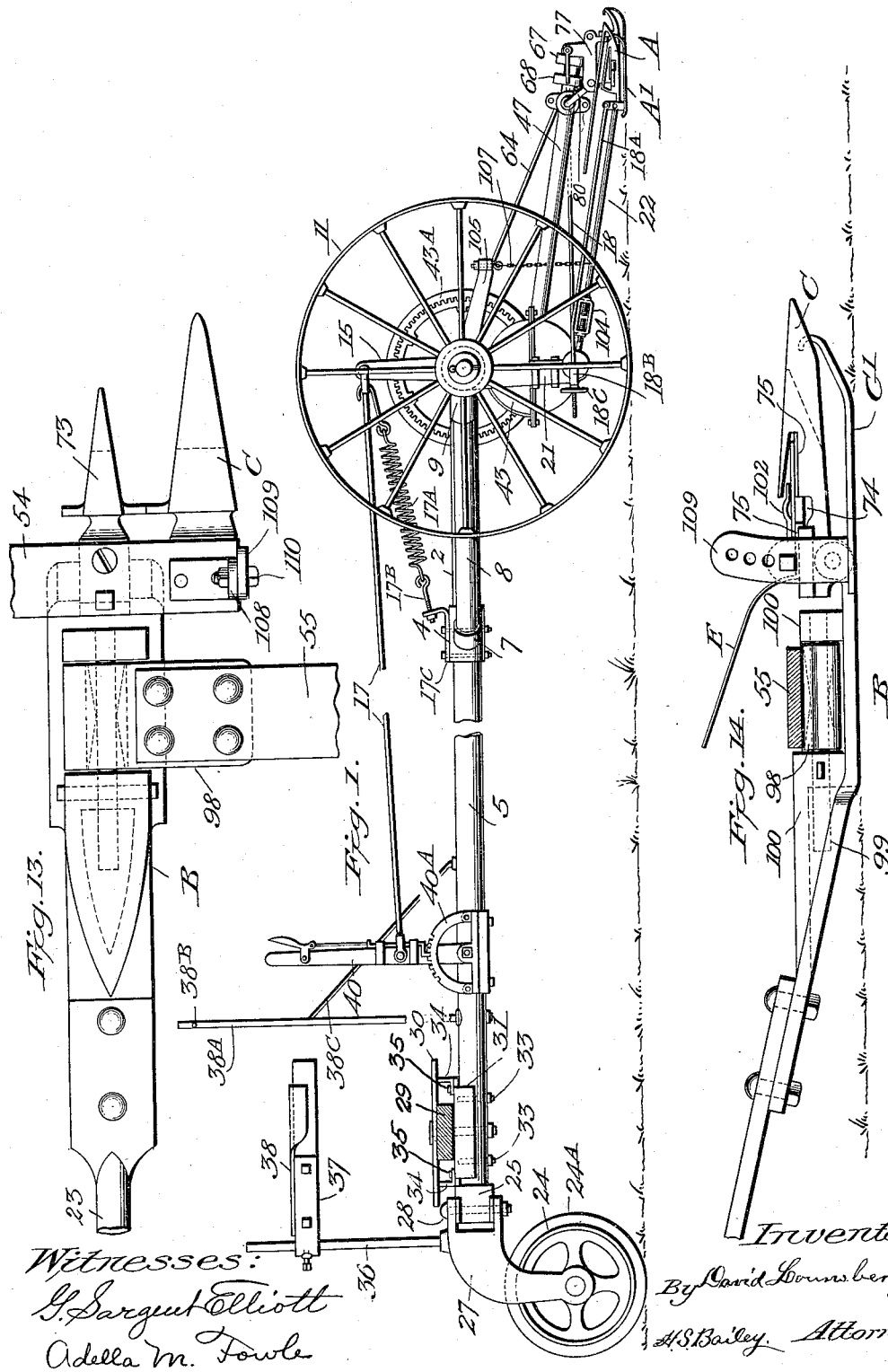

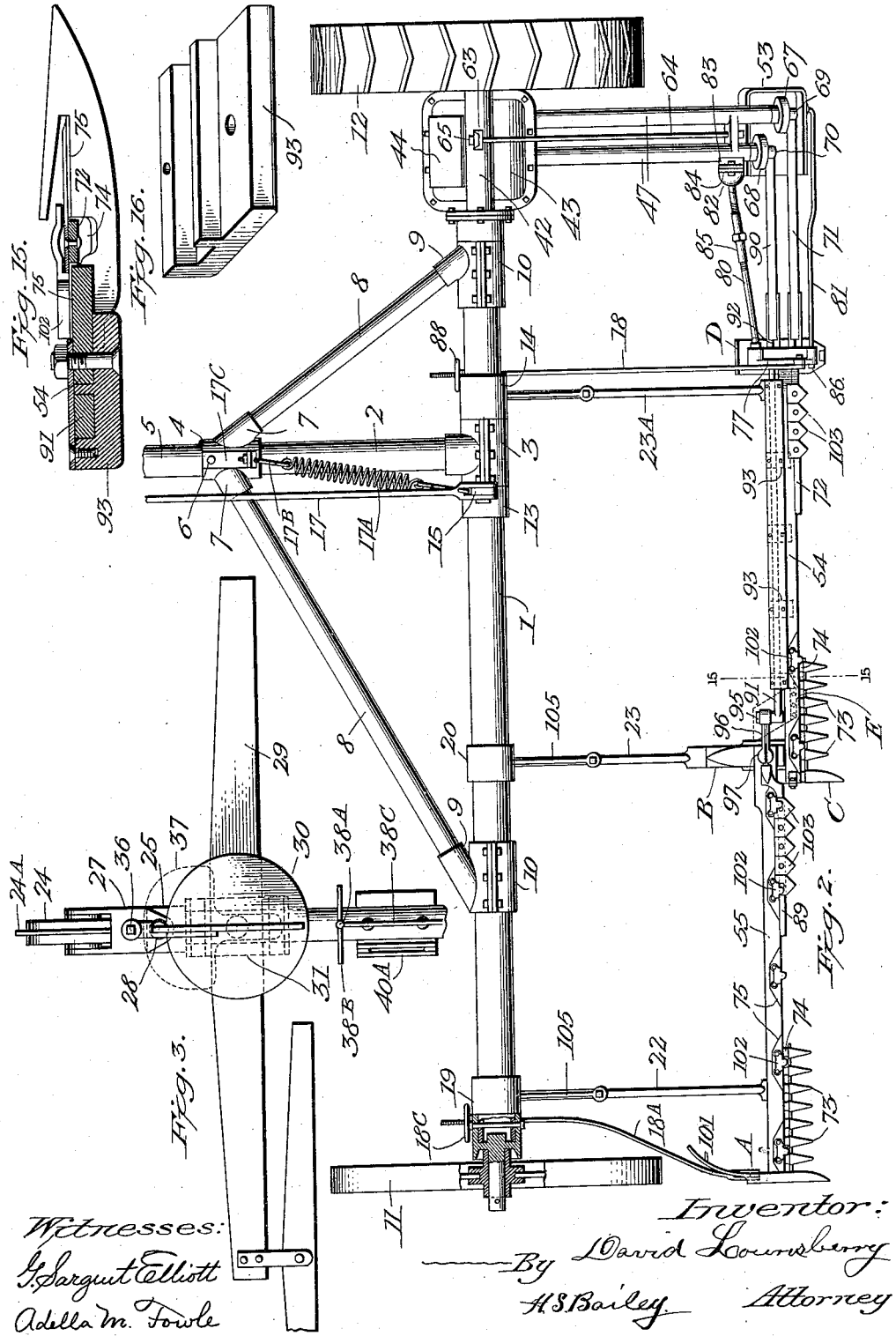

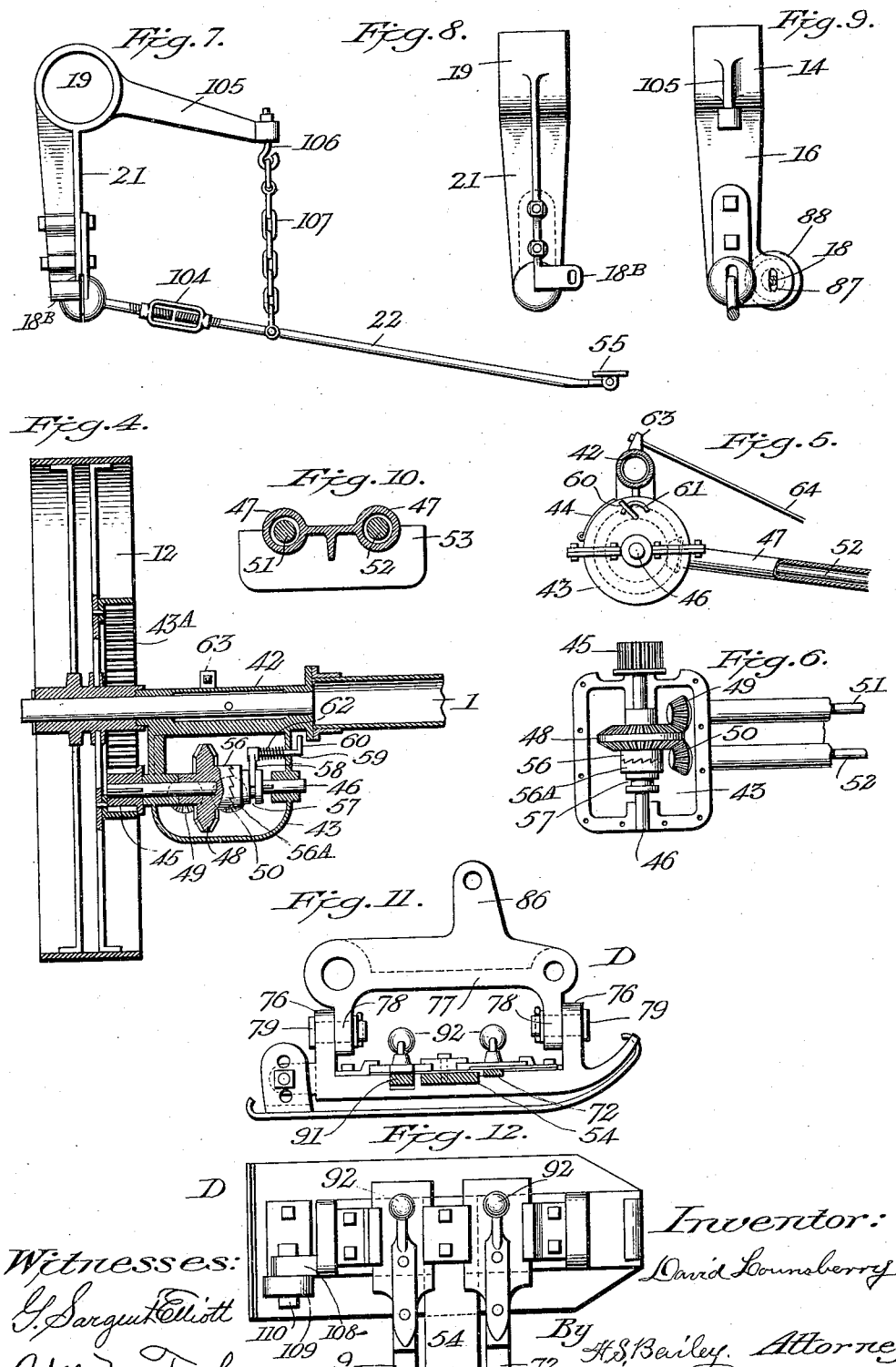

DAVID LOUNSBERRY, OF HOLYOKE, COLORADO.

HORSE-OPERATED PUSH-MOWER.

1,164,827.         Specification of Letters Patent.     Patented Dec. 21, 1915.

Application filed June 28, 1915. Serial No. 36,746.

*To all whom it may concern:*

Be it known that I, DAVID LOUNSBERRY, a citizen of the United States of America, residing at Holyoke, county of Phillips, and State of Colorado, have invented a new and useful Horse-Operated Push-Mower, of which the following is a specification.

My invention relates to improvements in horse operated push mowers, and the objects of my invention are: First, to provide a push mower for grass or grains that can be operated by one man and that has two independently power driven cutting bars. Second, to provide a multiple or duplex cutter bar push mower that will cut grass or grains close to the ground or at any practical distance of their height between the ground and their heads. And third, to provide a simple, practical and large acreage grass or grain cutting one-man operating and horse pushing mower that can be steered by the driver from his seat at the rear end of the machine. I attain these objects by the mechanism illustrated in the accompanying drawings, in which:

Figure 1, is a side elevation of my improved push mower. Fig. 2, is a plan view of the front portion of the machine. Fig. 3, is a plan view of the rear portion thereof. Fig. 4, is a vertical sectional view through the power transmitting traction wheel, and mechanism operated thereby. Fig. 5, is a detail side view of the gear housing shown in Fig. 4, and parts connected therewith. Fig. 6, is a plan view of the gear housing, the upper half thereof being removed. Fig. 7, is a side elevation of one of the lifting devices which are mounted on the driving axle and connected with the cutter bars. Fig. 8, is a rear view of the same. Fig. 9, is a rear view of a lifting device similar to that shown in Figs. 7 and 8, but arranged to support one end of a rod for adjusting the inclination of the cutter bar supporting shoes. Fig. 10, is a transverse sectional view through the sleeves or tubes which support the knife bar operating shafts. Fig. 11, is a side elevation of the left hand shoe which supports the forward cutter bar. Fig. 12, is a plan view thereof, the upper member of the same being removed. Fig. 13, is a plan view of the shoe which supports the adjoining ends of the front and rear cutter bars, the shoe on the adjacent end of the front cutter being also shown, together with one of the knife guards. Fig. 14, is a side view of the parts shown in Fig. 13. Fig. 15, is a sectional view on the line 15—15 of Fig. 2. And Fig. 16, is a perspective view of one of the guide blocks, which support the reach bar which operates the rear knife bar.

Similar letters of reference refer to similar parts throughout the several views.

Referring to the drawings, the numeral 1 designates a tubular axle.

2 designates a central draft brace, which consists of a tube that is threaded to a box 3, which is journaled on the axle. The outer end of this tongue holder is threaded into one end of a box 4, in the opposite end of which one end of a draft tongue 5, of wood or other suitable material, is secured by bolts 6, which extend through both the box and the tongue. This box 4 is provided with two angular disposed side sleeves 7, into each of which one of the ends of two angular side braces 8, which are preferably tubes, are threaded. The opposite ends of these brace tubes are threaded to sleeve lugs 9, that are projected from boxes 10 that are journaled on the axle 1. The axle 1 is free in the boxes 3 and 10 to be partially rotated by a hand operating lever, as will be presently described. On the opposite ends of the axle suitable ground wheels 11 and 12 are rotatably mounted on suitable axle journals. Collars 13 and 14 are secured on the axle on opposite sides of the box 3, which are provided with projecting levers 15 and 16, from which rods 17 and 18 project in opposite directions, as will be presently described. Collars 19 and 20 are also secured on the axle and are provided with crank levers 21, from which rods 22 and 23 project and extend to the cutter bar's supporting beam, as will be presently explained.

The tongue 5 extends rearwardly of the axle far enough beyond the position of the horses to be provided with a steering wheel 24. This steering wheel is a flat tired wheel that is provided with a projecting center flange 24^A, that holds it against lateral shipping movement when in the ground. This steering wheel is pivotally connected to a box casting 25 that is secured to the end of the tongue, by a yoke shaped casting 27, that straddles the steering wheel at its lower end and straddles the box casting 25 at its upper end, and the steering wheel is pivotally connected to this box casting and consequently to the end of the tongue by a vertically positioned bolt 28, that allows the steering wheel to swing and swivel throughout any practical arc of a circle that will turn the tongue's main axle and its supporting wheels. An even cross bar or whiffletree 29 is pivotally supported on the tongue adjacent to its end box 25, between two plates 30 and 31 by a bolt 32 that extends down through both plates and through the tongue. The lower plate 31 partially surrounds the tongue and is secured to it by bolts 33; the upper plate is provided with depending lugs 34 which rest on top of the lower plate and are secured to it by cap screws 35. These lugs 34 are long enough to raise the upper plate high enough above the lower plate to allow the evener cross bar or whiffletree to pivotally swing sufficiently on its pivotal bolt to allow of the horse's ample operative movement between it, and the axle of the machine in turning the machine around. The top of the upper plate 30 also makes a standing platform for the driver and a support for his feet when sitting. A steering post 36 projects vertically up from the supporting yoke of the steering wheel, and an arm 37 is adjustably mounted thereon, upon which is secured a seat 38, the arm being straddled by the driver when he is sitting in the seat. A vertical post 38$^A$ is positioned in front of the platform 30, its lower end passing through the tongue and being bolted thereto. Lateral handles 38$^B$ project from the upper end of this post which may be grasped by the attendant to steady his position on the platform. The post is supported by a brace rod 38$^C$, which extends from the post and is connected at its lower end to the tongue, in advance of the post. On the tongue at a short distance from the seat and the foot plate 30, a combined hand lever 40 and spring locking pawl rod and a ratchet toothed segment device 40$^A$ are secured. This locking lever device is commonly used on agricultural machinery. The hand lever 40 of this device is pivotally connected to one end of the connecting rod 17, the opposite end of which is pivotally secured to the lever 15 of the collar 13, that is secured on the axle. The ground wheels are of different types. The wheel 11 on the right hand end of the axle has a flat smooth face tire portion of such a width as will properly support the axle and its load under all conditions. The wheel 12 on the left hand end of the axle has a broad tractor type of tire and a double set of spokes. The circumferential surface of the tractor wheel is provided with projecting cross ribs which are preferably arranged to extend at rearward angles from the center and on opposite sides of the center of the wheel, to the side edges of the rim of the tire. Adjacent to this large traction wheel 12 a sleeve 42 is mounted on the axle, and a housing box 43 depends from the sleeve. This housing box is provided with a hinged door 44 which permits access to its interior to inspect and oil its mechanism. This housing box covers and supports the driving mechanism of the cutter bars and their cooperating parts. This driving mechanism comprises a large spur gear 43$^A$, that is secured to the insides of the adjacent spoke of the traction wheel 12, and this gear meshes with and drives as the traction wheel moves along the ground, a pinion 45. This pinion 45 is secured on the end of a short shaft 46, that extends through the housing 43 and is journaled in its opposite sides. Upon this short shaft 46, a combined double faced bevel gear and fly wheel 48 is loosely mounted, which drives two bevel gear pinions 49 and 50, which are secured to one of the ends of two shafts 51 and 52, that extend into the housing and are secured to these bevel gears. These pitman rods extend from these bevel gears through sleeves 47 to a housing box 53, where they are connected up to drive the knife bars of two cutter bars 54 and 55, as will be presently explained.

The double faced bevel gear 48 is provided with a part clutch portion 56, which is arranged to be engaged by a similar half part clutch portion 56$^A$ that meshes with it and which is feather-keyed to the shaft 46. This part clutch 56$^A$ is provided with a hub in which an annular groove 57 is formed, that is engaged by a crescent shaped end of a lever 58, the opposite end of which is secured on a rock shaft 59 that is journaled in the adjacent end of the housing and projects through and beyond it, and to its outer end a hand lever 60 is secured, which engages a wedge shaped cam 61, that is arranged in the form of a semicircle within the swinging path of the hand lever, and is arranged to draw the part clutch 56$^A$ away from the part clutch of the gear and consequently disengage the shaft 46 from the gear. The part clutch 56$^A$ however is arranged to be held in mesh with the part clutch of the gear by a spring 62 which is mounted on the rock shaft 59 and is arranged to press the crescent lever and consequently the part clutch with a constant resilient pressure against and in mesh with the clutch of the gear, which secures the shaft 46 to the gear. Consequently the gear on the tractor wheel drives the shaft and the shaft the gear, through this releasable clutch 56$^A$, and the gear the small bevel gears and the pitman rods. The hand lever 60 can be locked to the cam 61 by any suitable means to hold the part clutch in its unlocked position against the pressure of the spring 62.

The sleeve 42 is provided with an upwardly projecting lug 63 and a threaded rod 64 extends loosely through the lug, and a nut 65 is adjustably threaded on the end of the rod and against the lug. This rod 64 extends to and loosely through a web 66 connecting the sleeves 47 and a nut is screwed on the end of the rod against the face of the web, and the rod 64 thus supports the lower ends of the sleeves 47 together with the housing 53.

The two shafts 51 and 52 are loosely surrounded by the tubes or sleeves 47 that are cast integral with a web portion between them to insure their being at parallel and equal distances apart, and are formed integral with the lower half of the housing 43 and with the housing 53. The ends of these tubes are babbitted around the rods to form bearings for rods at the ends of the tubes. On the outer ends of each of the pitman shafts 51 and 52, crank disks 67 and 68 are secured. These crank disks are each provided with crank pins 69 and 70. To the crank pin 69 one end of a connecting rod 71 is pivotally mounted, the opposite end of which is pivotally connected by a ball and socket joint of any suitable construction directly to the knife bar 72 of the cutter bar 54. There are two cutter bars 54 and 55 to my machine. One of these bars is a continuation of the other, but is slightly offset to one side of the other in order to enable me to drive the knife bars of each cutter bar independently of the other.

Each cutter bar comprises two ground shoes A and B and C and D respectively, that define its opposite ends, and the bar that extends from one shoe to the other. To these two cutter bars knife guard castings 73 are securely bolted, and the knife bar extends from one shoe to the other and reciprocates between the edge of the cutter bar and the vertical edges of a row of recesses 74 formed in the row of guard castings, and the knives are riveted or otherwise secured to the knife bar and extend over it and bear on wearing plates 75 that are secured to the top surface of the guards and cutter bars.

The cutter bar 54 that is the farthest from the axle and the nearest to the housing box 53, I term the front cutter bar, and the cutter bar 54 that extends beyond this front cutter bar I term the rear cutter bar. The shoes comprise castings that have their front ends curved upwardly and are arranged and adapted to move over the ground close to it or to rest flat on and slide over it. The grass and grain cutting knives which are secured to the knife bars are the same as are in common use on mowing machines. The shoe D is provided with vertical lugs 76 adjacent to its opposite ends, and a cross bar 77 that is provided with depending lugs 78 is pivotally hinged to the lugs 76 by bolts 79. This cross bar is connected at its opposite ends to one of the ends of two brace rods 80 and 81. The opposite end of the brace rod 80 is secured to the adjacent sleeve 47 by a ball and socket bearing joint, which may be of any suitable construction and arrangement. This joint consists of a separable socket 82 that is formed partly in a plate 83 that projects from the adjacent sleeve 47 that supports the pitman rod 52 of the cutter bar's driving mechanism, and in a plate 84 which is bolted to the plate 83, while a ball member is formed on the end of the rod 80 that fits loosely in the socket 82. This brace rod 80 is divided and a turn buckle nut 85 is threaded to its ends, which allows the tension of the rod to be adjusted as desired. The opposite end of the brace rod 81 is connected to the outside of the housing box 53. The front end of the cross bar of this shoe is provided with a projecting lug 86 which is pivotally connected to one end of the rod 18, which I term the shoe tilting rod. The opposite end of this tilting shoe rod extends loosely through a slot 87 formed in the lower end of the lever 16 that is formed on the collar 14 that is fastened on the axle, and on its free end a hand wheel 88 is threaded, which permits the front end or nose of the shoe to be tilted up or down, as desired, by turning the wheel to draw or release the rod. A rod $18^A$ coöperates with the rod 18, in holding the shoes and consequently the cutter bars at the angle to which they have been tilted. This rod $18^A$ is pivotally connected at its forward end to the rear end of the shoe A, and its opposite end is threaded, and passes through a slotted lug $18^B$ on the lower end of the lever 21, and receives a hand wheel $18^C$ by which the rod may be drawn upon or released in coöperating relation with the rod 18.

The rear cutter bar extends beyond the front cutter bar and is an independent extension of the front cutter bar. This rear cutter bar is similar in construction as to its principal features to the front cutter bar, but its knife bar 89 receives its reciprocal motion from a connecting rod 90 and the shaft 52 through the medium of a reach rod 91, which is connected by a ball and socket joint 92 with the connecting rod 90 at the shoe D. This reach rod is mounted in guide blocks 93, that are secured to the under side of the bar 54. The rod 90 is held in the guide blocks by a cover plate 94. This cover plate is secured to the top of the bar 54 and to the guide blocks 93, and it extends along the greater part of the length of the connecting bar 54. The outer end of this reach rod is pivotally connected by a bolt 95 to the end of a short link bar 96, the opposite end of which is connected by a ball and socket joint 97 to the rear knife bar 89, which is slidably mounted in the guards 73 of the bar 55, which connects the shoes A and B. A shield E, which is shown in dotted lines, Fig. 2, and in full lines, Fig.

14, is secured to the cutter bar 54, in position to extend back over and thus protect the adjacent end of the reach bar 91, and the link 95 which connects the said reach bar to the knife bar 89.

The shoe A is in the form of a guard similar to but longer than the guards 73, and a runner A¹ is connected to its front end, and adjustably secured to its rear end. The bar 55 is rigidly secured to this shoe A and to a plate 98, which is pivotally mounted on a bolt 99 which extends through lug portions 100 on the shoe B. The forward end of the shoe B has a hinge connection with the bar 54, near the adjacent end of the same, and upon this end of the bar 54 is rigidly secured the shoe C, which is similar to the shoe A, and comprises a guard portion, to the front end of which a runner C¹ is secured, the rear end of said runner being adjustably secured to the shoe as clearly shown in Fig. 14. The bar 54 is rigidly bolted to the shoes C and D, and on the bars 54 and 55 are bolted at intervals guards 102, having forward projecting portions which extend out over the knife bars 72 and 89, and the said knife bars are thus held in slidable engagement with the guards 73. The knives 103 are of the usual form, and are riveted to the knife bars, and their ends slide upon the bars 54 and 55, and upon the guards. The end shoe A has an over-reaching bar portion 101, and its point is curved outwardly in order to form a grass and grain parting point that will bend the marginal edge of the swarth the cutter bars will cut at this shoe, into the knives.

The collars 19 and 20 are each provided with depending lever portions 21, and the collar 14 is provided with a lever 16, at the lower ends of which levers one of the ends of the three supporting and raising rods 22, 23 and 23ᴬ are secured by ball and socket joint connections which may be of any suitable construction. The opposite ends of the rods 22 and 23ᴬ are secured to the under side of the bars 55 and 54 respectively, while the opposite end of the rod 23 is secured to the shoe B. These rods are each divided and a turn buckle nut 104 is threaded to the divided ends of each, which permits them to be properly adjusted relative to each other to hold the cutter bars in substantially parallel alinement with the axle. My invention contemplates means by which these cutter bars and their shoes can be raised from the ground any distance up to about two feet, and while there are a number of ways in which this feature of my invention can be carried out I preferably construct and arrange it in the following manner.

From the body portions of each of the collars 14, 19 and 20, an arm 105 is extended toward the cutter bars for a short distance, and in the end of each arm an eye bolt 106 is adjustably secured, to which one end of a chain 107 is secured; the opposite ends of these chains are secured to the rods 22, 23 and 23ᴬ, and whenever the driver desires to raise the cutter bars he grasps the hand lever and its spring controlled locking bolt, and manipulates it to allow him to pull this lever toward him, which being connected to the lever 15 by the connecting rod 17 turns the axle and raises the arms 105 upward, which lifts the rods 22, 23, and 23ᴬ through the chains 107 and consequently lifts the cutter bars and the shoes off of the ground.

A spring 17ᴬ is connected at its forward end to the forward end of the connecting rod 17, and the rear end of this spring is attached to one end of a threaded rod 17ᴮ, the opposite end of which passes through a plate 17ᶜ which is secured upon the coupling 4, and receives a nut, by which the desired tension of the spring may be had. This spring exerts a continuous pull on the lever arm 15, which not only assists in raising the cutter bars, when the lever 40 is drawn upon for that purpose, but it also prevents the sudden drop of the cutter bars, when they are released by the hand lever, to restore them to their operative or working position.

I have provided a wearing plate or runner for the shoes A, C and D as before mentioned, and these wearing plates are arranged to fit over the bottoms of the shoes, and their forward ends are curved up and hook into apertures formed in the front end of the shoes, while the rear end of each shoe is provided with a projecting lug 108, and each wearing plate is provided with a vertical lug 109 that is provided with bolt receiving apertures, and this lug is thus adjustably bolted to the lug of its shoe by a bolt 110.

The operation of my new push mower is as follows: The rolling action of the traction wheel on the ground imparts a continuous rotary movement to the shaft 46 in the housing box 43 through the medium of the gear 43ᴬ on the traction wheel and the pinion 45, which is driven by it and is mounted on the shaft 46 of the housing box, and the rotary movement of this shaft 46 is imparted to the double faced bevel gear 48 and to the shafts 51 and 52 whenever the driver desires to start the knife bar reciprocating mechanism of the cutter bars, by his grasping the clutch, throwing the hand lever 60, and releasing it from the cam 61, which allows the clutch spring to slide the clutch along the shaft into engagement with the clutch of the double faced gear. The gear 48 then rotates the shafts 51 and 52 and their crank pin disks through the medium of the small bevel gear pinions 49 and 50 on the ends of the said shafts that mesh with the double faced gear 48.

The crank pin disks of the shafts 51 and 52 reciprocate by their rotary movement the connecting rods 71 and 90. The connecting rod 71 is connected directly to the knife bar 72 and reciprocates it and the grass and grain cutting knives it carries in the guards of the front cutter bar.

The connecting rod 90 is connected to the end of the reach rod 91 and reciprocates it in slideway slots formed in the shoe D and in the lugs 93 that are secured to the bar 54, and this reach rod reciprocates the link bar 96 and this link bar is connected directly to the knife bar 89 of the rear cutter bar 55, and reciprocates it and its knives in the guards of the rear cutter bar. The driver is enabled to tilt the front parts of all of the shoes and also both cutter bars either upwardly or downwardly or above or below the heel of these shoes, by turning the hand wheel 88, on the rod 18. The driver can also bodily raise and lower and lock in any position he desires, both cutter bars from his seat by grasping and manipulating the hand lever and its spring locking bolt in the ratchet toothed segment any distance above or close to the ground he desires up to about two feet high above the ground, as when he pulls this lever toward him he turns the axle and causes the sleeves 14, 19 and 20, and the arms 105, and the levers, to act on the chains 107 and rods to lift the two cutter bars bodily, and he can lock them in any position he desires. Consequently he can lower them flat on the ground and cut grass close to the ground, or he can raise them high enough to cut wheat and other grains just below their heads, or if desired several inches above the ground, as the knife bars and knives can be operated in any practical grass or grain cutting position of the cutter bars. When however the driver is going to and from a field or along a road, he throws the clutch 56^A out of engagement with the pitman driving gear 48 by throwing the clutch lever 60 to the high end of the cam. The two brace rods 80 and 81 of the front shoe D permit of the lifting movement of the cutter bars.

My invention provides a thoroughly practical push mower that can be operated by one man and that will mow from about thirty to fifty acres of grass or grain per day.

Having described my invention, what I claim as new and desire to secure by Letters Patent, is:

1. In a push mower, the combination of the partially rotating axle, the tongue extending rearwardly of the axle, the steering wheel and apparatus and the evener bar at the end of said tongue, and the plain and ribbed traction wheels, and the cutter bars projecting in front of said axle and arranged to be vertically raised and lowered from said steering mechanism, said ribbed traction wheel being provided with a gear, with a housing on said axle, a shaft journaled in said housing, a hand operating clutch feather-keyed on said shaft, a pinion on said shaft meshing with said traction wheel's gear, a double faced bevel gear loosely mounted on said shaft and provided with a clutch arranged to be engaged by said shaft's hand operating clutch, a pair of parallel shafts journaled at one end in said housing, each of which is provided with a beveled pinion arranged to mesh with one of the sides of said double faced gear, whereby both pinions and parallel shafts are rotated in unison, suitable supporting casings for said parallel shafts extending from said axle and having adjacent to said cutter bar crank pin disks mounted on the outer ends of said parallel shafts, knife bars reciprocating in said cutter bars, and means including connecting rods for driving said knife bars from said parallel shafts' crank pin disks.

2. In a push mower, the combination of a tongue provided with a steering wheel at one end, an axle rotatively mounted in the bearings of said tongue, a steering post projecting from said steering wheel, a steering bar, and a driver's seat secured to said steering post, collars secured to said axle at equidistances apart, each of which is provided with an arm arranged to project in front of said axle and tongue, and a depending bracket portion depending below each axle, a rod secured to each bracket at one of their ends by a universal joint, a grass and grain cutting bar mechanism operatively secured to the opposite ends of said rods, a chain connecting each of said arms to each of said rods, means including a hand grasping and locking bolt device for partially rotating said axle from the driver's seat to raise or lower the cutter bar mechanism, and means connected with said axle and traction wheel for operating said cutter bar mechanism.

3. In a machine of the character described, the combination with a frame, an axle loosely mounted therein and traction wheels on said axle, one of which carries a gear wheel, of middle and outer bell crank shaped supports rigidly secured to said axle, rods extending forward from the depending members of said supports, a shoe on the outer end of the middle rod, bars extending from said shoe in opposite directions and secured to the shoe and to the outer supporting rods, one bar being in advance of the other, shoes on the outer ends of said bars, chains connecting said rods and the horizontal members of said supports, means for partially rotating said shaft thereby to raise said shoes out of contact with the ground, knife guards on said bars, knife bars slidably mounted in said guards, parallel shafts, gearing operated by the traction gear wheel for rotating said parallel shafts, crank disks on said shafts, and means connecting the crank disks and knife bars whereby the latter are given a reciprocating movement.

4. In a machine of the character described, the combination with a frame, an axle loosely mounted therein and traction wheels on said axle, one of which is provided with a concentric ring gear wheel, of a middle and outer bell crank shaped supports rigidly secured to said axle, forwardly extending arms having a ball and socket connection with the depending members of said supports, a shoe on the outer end of the middle arm, bars secured at their inner ends to said shoe, and extending in opposite directions therefrom, and out of line with each other, their outer portions being secured to the respective outer arms, chains connecting the arms and the horizontal members of said supports, shoes on the outer ends of said bars, a hand lever and connections for partially rotating said shaft to raise said shoes out of contact with the ground, knife guards on said bars, knife bars slidably mounted in said guards, parallel shafts and gearing operated by the traction wheel gear for rotating said shafts, crank disks on the ends of said shafts, a connecting rod extending from one of the crank disks and having a ball and socket connection with the adjacent end of one of said knife bars, a connecting rod extending from the other crank disk, a reach bar having a ball and socket connection with the latter connecting rod and with the other knife bar, and means for varying the inclination of said shoes with respect to the ground.

5. In a machine of the character described, the combination with a frame having a guide wheel at its rear end, and an axle loosely mounted in the forward end thereof, of cutter bar supports comprising sleeves rigidly mounted on said axle, arms extending from said sleeves at right angles to each other, forwardly extending rods having a ball and socket connection at one end, with the depending arms of said sleeves, chains connecting the said rods and the horizontal arms of said sleeves, cutter bars on the forward ends of said rods, traction wheels on said axle, one of which carries a gear wheel, knife bars slidably mounted on the cutter bars, means operated by the gear on the traction wheel, for reciprocating said knife bars, an arm extending from the axle, a hand lever on said frame, a rod connecting said arm and said hand lever, whereby the said axle may be given a partial rotation to lift the cutter bars away from the ground, and means for cushioning the groundward movement of the cutter bars.

6. In a machine of the character described, the combination with an axle and traction wheels thereon, one of which carries a concentric gear wheel, of a depending housing on said axle, a shaft mounted therein, a pinion on said shaft in mesh with the traction wheel gear, a twin faced gear on said shaft, parallel shafts extending forward from said housing having pinion gears in mesh with teeth of the twin faced gear, forwardly extending supports on said axle, cutter bars on said supports, knife bars slidably mounted on said cutter bars, and means connecting the knife bars and the parallel shafts, whereby the knife bars are reciprocated.

7. In a machine of the character described, a frame having a steering wheel, an axle loosely mounted in said frame, traction wheels on said axle one of which is provided with a gear wheel, a depending housing on the axle adjacent the traction wheel gear, tubular shaft housings extending forward from said housing, shafts in said tubular housings having crank disks on their forward ends, and gearing connecting said shafts with the traction wheel gear, a middle and outside shoes in line with the forward ends of the shafts, a cutter bar connecting the middle shoe and the shoe farthest from the shafts, a cutter bar connecting the middle shoe and the shoe nearest the shafts, and positioned forward of the first cutter bar, slideways in said latter shoe, a knife bar slidably mounted on the forward cutter bar and in one of the slideways of said shoe, a rod connecting the knife bar and one of the crank disks, a knife bar on the rear cutter bar, a reach bar connected to the same, the other end of which is mounted in the other slideway of the shoe, supports for said cutter bars which are connected to the axle, means for varying the inclination of the shoes, and means for partially rotating the axle to lift the shoes from the ground.

8. In a machine of the character described, the combination with a frame, an axle loosely mounted therein having traction wheels thereon, forwardly extending supports rigidly secured to said axle, cutter bars on said supports, having shoes on their ends, of means for inclining said shoes comprising rods pivotally connected to the outer shoe of each cutter bar, their opposite ends being threaded, depending arms rigidly secured to said axle having slots through which the said threaded ends of the rods pass, and hand wheels threaded to said threaded ends, which bear against said arms.

In testimony whereof I affix my signature in presence of two witnesses.

DAVID LOUNSBERRY.

Witnesses:
G. SARGENT ELLIOTT,
ADELLA M. FOWLE.

Copies of this patent may be obtained for five cents each, by addressing the "Commissioner of Patents, Washington, D. C."